United States Patent

Zimmerer

[15] 3,680,650

[45] Aug. 1, 1972

[54] WEIGHT SENSING DEVICE
[72] Inventor: Robert W. Zimmerer, Boulder, Colo.
[73] Assignee: Scientech, Inc., Boulder, Colo.
[22] Filed: Nov. 10, 1971
[21] Appl. No.: 197,336

[52] U.S. Cl..............................177/210, 177/212
[51] Int. Cl...........G01g 3/08, G01g 7/06, G01g 7/02
[58] Field of Search................177/210, 212, 1, 164

[56]  References Cited

UNITED STATES PATENTS

| | | | |
|---|---|---|---|
| 2,597,831 | 5/1952 | Willis | 177/164 |
| 3,078,936 | 2/1963 | Thomson | 177/210 |
| 3,133,606 | 5/1964 | Thomson | 177/210 |
| 3,172,493 | 3/1965 | Von Koch et al. | 177/210 |
| 3,519,095 | 7/1970 | Tomes | 177/212 |
| 3,604,525 | 9/1971 | Blethen et al. | 177/212 |

FOREIGN PATENTS OR APPLICATIONS

| | | | |
|---|---|---|---|
| 1,159,197 | 2/1958 | France | 177/210 |
| 736,006 | 8/1955 | Great Britain | 177/210 |
| 919,771 | 2/1963 | Great Britain | 177/210 |

*Primary Examiner*—Robert S. Ward, Jr.
*Attorney*—Stephen C. Shear

[57] ABSTRACT

A device for indicating the weight of an object is disclosed herein and includes a first circuit for producing an oscillatory excitation signal which is capacitively coupled to a second circuit for producing at the output of said second circuit a signal indicative of the weight of said object. In this regard, the second circuit is capacitively coupled to the first circuit by a coupling plate mounted to a support member for movement in response to the weight of said object. This output signal is applied to an electromagnetic assembly which, in response thereto, applies to said coupling plate a proportional force which is equal and opposite to the gravitational force of the supported object for terminating movement of said coupling plate. In this manner, the output signal may be monitored for indicating the weight of said object.

9 Claims, 2 Drawing Figures

INVENTOR.
ROBERT W. ZIMMERER

WEIGHT SENSING DEVICE

BACKGROUND OF THE INVENTION

1. Field of the Invention

The present invention relates generally to balancing devices and more particularly to an electromagnetic device for measuring the weight of an object.

2. Description of the Prior Art

The necessity for determining the weight of small lightweight articles, even minute particles, is readily apparent. This is particularly evident in, for example, the field of pharmacology where grams of ingredients are necessarily mixed together in exact proportions. Heretofore, there have been many balancing devices for making such measurements such as, for example, the electromechanical type or the strictly mechanical type, both of which have been found to be somewhat inaccurate in making small measurements and, therefore, not completely satisfactory for their intended use.

More recently, capacitance responsive devices have been suggested but have been found to be complicated, both from a structural standpoint and an electrical standpoint. In addition, many of these more recent devices utilize sinusoidal and similar operating signals which produce further problems such as, for example, harmonic and phase shift distortion, as well as requiring additional and more complicated circuit components.

SUMMARY OF THE INVENTION

The present invention, which provides a heretofore unavailable improvement over previous balancing devices, comprises a device for indicating the weight of an object in an accurate, reliable and uncomplicated manner. The device, in response to the weight of an object, capacitively couples an excitation signal, preferably a square wave signal, from a first circuit to a second circuit for producing an output signal having a characteristic indicative of the weight of the object under consideration.

Accordingly, an object of the present invention is to provide a new and improved device for measuring the weight of an object, especially objects weighing, for example, one gram and less.

Another object of the present invention is to provide a new and improved weight measuring device which is accurate and reliable in operation, uncomplicated in construction and economical to manufacture.

Yet another object of the present invention is to provide a new and improved weight measuring device which eliminates quadrature distortion such as, for example, harmonic and phase shift distortion and which may be adapted for use with a simple and economical excitation source.

Still another object of the present invention is to provide a device of the last-mentioned type utilizing a square wave excitation signal and a capacitance coupling principle for producing an electrical signal indicative of the weight of an object.

Yet another object of the present invention is to provide a new and improved device which minimizes the number of components required for indicating the weight of an object.

Still another object of the present invention is to provide a new and improved weight indicating device which utilizes a capacitance coupling principle and an uncomplicated capacitance coupling arrangement for carrying out said principle.

A further object of the present invention is to provide a new and improved weight indicating assembly which capacitively couples an excitation signal from a first circuit having a pair of capacitor plates to a second circuit having a pair of capacitor plates for producing a weight indicative signal at a single junction connected directly to said second-mentioned capacitor plates.

These and other objects and features of the present invention will become apparent from the following descriptions.

DETAILED DESCRIPTION OF THE INVENTION

Figure 1:
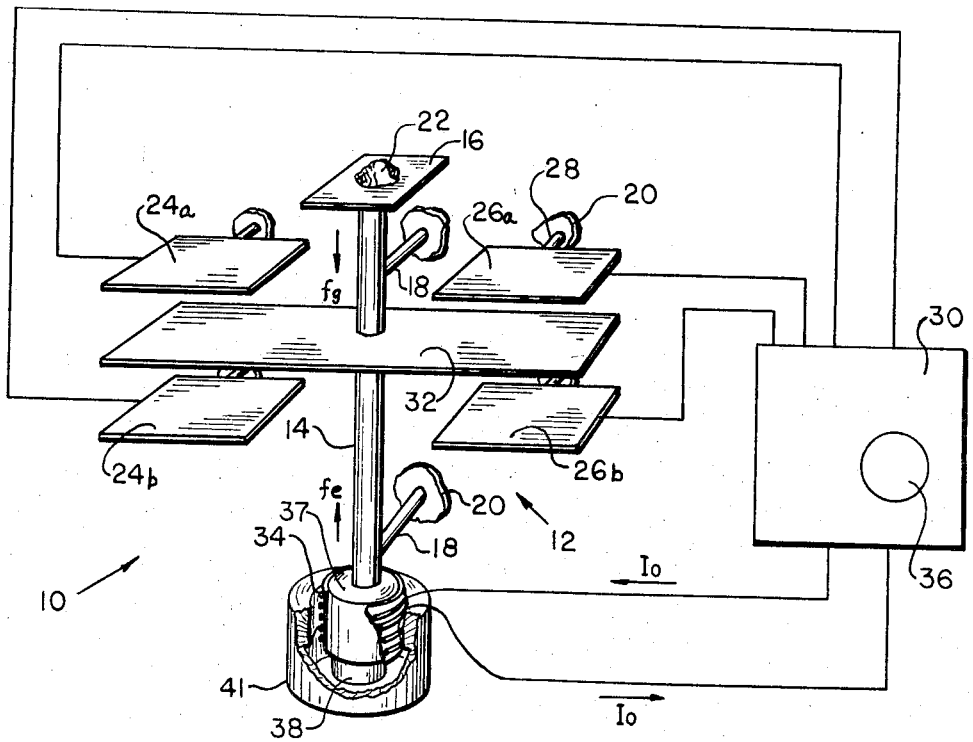
FIG. 1 is a partial schematic diagram and partial perspective view of a weight sensing device constructed in accordance with the present invention.

Turning now to the drawing, wherein like components are designated by like reference numerals throughout the various figures, a device for determining and indicating the weight of an object is illustrated in FIG. 1 and is generally designated by the reference numeral 10. As will be described in more detail hereinafter, device 10, utilizing preferably a square wave excitation signal and a capacitance coupling principle, produces a DC current in response to the weight of an object under consideration. This DC current is applied to an electromagnetic arrangement for producing a linearly proportional electromagnetic force equal in magnitude and opposite in direction to the gravitational force of the object. In this manner, the DC current can be measured by an appropriately calibrated meter for designating, for example, within one milligram, the weight of the object under consideration.

As illustrated in FIG. 1, device 10 includes an object support assembly 12 having a vertically extending, preferably dielectric, post 14 and a balance pan 16 centrally mounted to the top end of the post. A plurality of leaf springs or other suitable means 18 are provided for mounting post 14 to a stationary support generally designated by the reference numeral 20 so that the post is capable of moving in an axial direction but is prevented from moving in any other direction. Accordingly, when an object 22, the object under consideration, is placed on balance pan 16, post 14 moves axially downward in response to the gravitational force Fg applied to the post by the object.

A first pair of horizontally extending and vertically spaced electrically conductive capacitor plates 24a, 24b and a second pair of horizontally extending and equally vertically spaced electrically conductive capacitor plates 26a, 26b are positioned on opposite sides of post 14 and in horizontal alignment with each other. The capacitor plates, which are mounted in these positions to stationary support 20 and electrically insulated therefrom by suitable dielectric fastening means 28, comprise an important part of a circuit arrangement 30 responsible for providing the aforedescribed DC current (designated $I_o$) in response to the weight of object 22.

An equally important part of circuit arrangement 30 is a horizontally extending and electrically conductive capacitance coupling plate 32 which is centrally mounted to post 14 for movement therewith and which extends outward so as to be between capacitor plates 24a and 24b on one end and capacitor plates 26a and 26b on the opposite end. As illustrated in FIG. 1, coupling plate 32 is physically connected only with post 14 which, of course, results in a rather uncomplicated mechanical structure and, therefore, a more economical device.

Operationally, with no object supported on balance pan 16, that is, with only the tare weight of support assembly 12, coupling plate 32 is centrally positioned between upper capacitor plates 24a, 26a and lower capacitor plates 24b, 26b. In this position, circuit arrangement 30 produces no output current $I_o$ and, therefore, indicates zero weight on balance pan 16, that is, the tare weight of the device. Upon placing an object 22 on the balance pan, post 14 and coupling plate 32 move downward causing the latter to change its position relative to the capacitor plates. This, in turn, causes circuit arrangement 30 to produce output current $I_o$ which is dependent upon and proportional to, both in magnitude and polarity, the position of the coupling plate relative to the capacitor plates.

Output current $I_o$, which increases as coupling plate 32 moves closer to plates 24b and 26b, is applied to a coil 34 and thereafter to an appropriately calibrated meter 36. Coil 34 is positioned around a dielectric core 37 which, in turn, is mounted to the lower end of post 14 around an iron slug 39. A permanent magnet such as, for example, a pot magnet 38 displaying radial symmetry and a radial magnetic field is suitably mounted under slug 39 and enclosed by an iron casing 41, as illustrated in both FIGS. 1 and 2. In this manner, current $I_o$ and the magnetic field of magnet 38 cooperate to produce an axially upward electromagnetic force Fe on post 14, the force being linearly proportional to current $I_o$. As the weight of object 22 moves coupling plate 32 closer to plates 24b and 26b, the current $I_o$ increases, causing the electromagnetic force to increase linearly therewith. When the forces Fg and Fe come into equalibrium, the downward motion of plate 32 terminates. This, of course, means that the current $I_o$, which is linearly proportional to Fe, is, at this time, linearly proportional to Fg and, therefore, the weight of object 22. Accordingly, by measuring this current with appropriately calibrated meter 36, the weight of object 22 can be determined.

Figure 2:
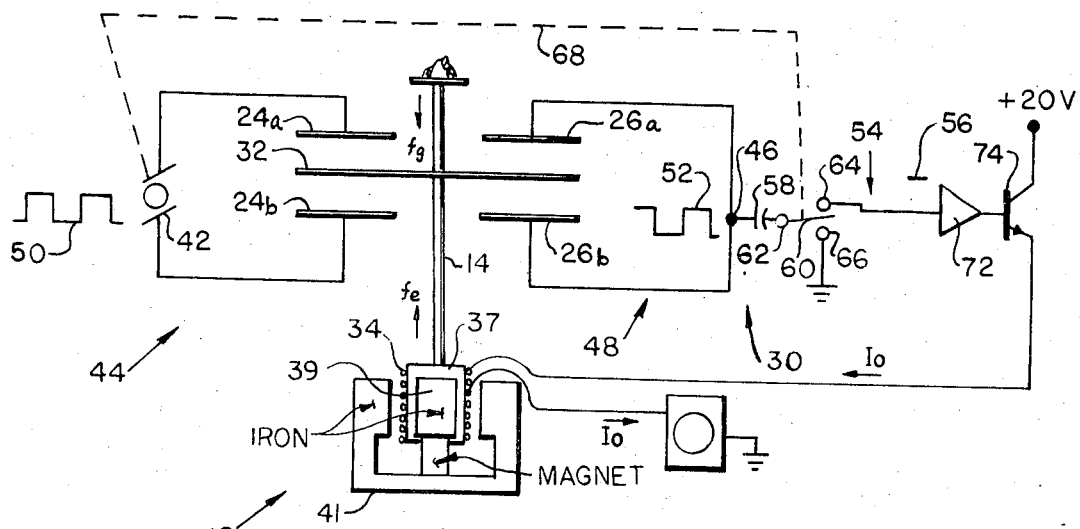
FIG. 2 is a schematic diagram of the electrical circuitry utilized with the device of FIG. 1.

Turning to FIG. 2, attention is now directed to the details of circuit arrangement 30 which, as stated above, include capacitor plates 24a, 24b and 26a, 26b, as well as capacitance coupling plate 32. As illustrated, capacitor plates 24a and 24b are respectively connected to opposite sides of an oscillatory signal producing source 42, which, in conjunction with the capacitor plates, comprise a first or excitation circuit 44. On the other hand, capacitor plates 26a and 26b are respectively connected to an output junction 46 so as to form a second or output circuit 48.

Operationally, in response to an oscillatory excitation signal 50, provided by source 42, circuit 44 produces across plates 24a and 24b a similarly shaped signal which is capacitively coupled to circuit 48 by movable or floating plate 32, if the latter is off center, that is, closer to the lower capacitor plates than the upper capacitor plates, or vice versa. Assuming for the moment that the coupling plate is closer to capacitor plates 24b and 26b, due to the weight of object 22, circuit 48, in response to the coupled signal, produces at output junction 46 a similarly shaped signal 52, displaying a frequency equal to that of excitation signal 50 and an amplitude dependent upon and proportional to the distance in which plate 32 is off center. As will be seen hereinafter, this signal is initially responsible for producing the aforedescribed DC current $I_o$.

On the other hand, if coupling plate 32 is on center or equidistant from the upper and lower capacitor plates, which is the case when post 14 is in its equilibrium state, that is, when the post is not supporting an object, the signal on plate 32 averages to zero. This, in turn, eliminates any production of a signal at the output junction 46 of circuit 48 and, accordingly, eliminates any production of DC current $I_o$.

Attention is directed back to oscillatory signal producing source 42, which, in accordance with the present invention, preferably comprises a multivibrator circuit or other similar simple and economical generator for providing a square wave or nearly square wave excitation signal 50 which, in turn, causes a square wave output signal 52 to be produced at junction 46. In addition to taking advantage of a simple and economical generator, the utilization of a square wave excitation signal eliminates harmonic distortion and phase shift distortion as well as other similar quadrature distortion otherwise caused by the use of, for example, a sinusoidal signal which, heretofore, has been suggested for exciting capacitor coupled weighing devices. In this regard, it should be readily apparent that distortion of the type described, if present, could adversely affect the accuracy of a weighing device in a substantial way, especially where the device is provided for weighing lightweight articles of, for example, one gram or less. In addition, by utilizing a square wave signal, more of the signal is available for determining the weight of an object than is the case when utilizing a sinusoidal signal. This is due to the fact that output signal 52, as will be seen hereinafter, is processed for producing a signal which is proportional to the area of the wave form and clearly a sine wave has less such area than a square wave and, thus, does not produce as accurate a proportional signal as a square wave. Other advantages in utilizing a square wave excitation signal will become apparent hereinafter.

Turning now to the remainder of the circuitry making up device 10, attention is firstly directed to a synchronous switch arrangement 54 provided for converting the output signal 52 into a DC signal 56, the amplitude of which is proportional to the peak-to-peak value of signal 52. In this regard, arrangement 54 includes a capacitor 58 and a switch 60 connected at one end to a junction point 62 so that its otherwise free end switches between a pair of junctions 64 and 66. As illustrated in FIG. 2, the switch is connected with signal producing source 42, as diagrammatically shown by dotted line 68, and is responsive to excitation signal 50 for switching between junctions 64 and 66 in synchronism with the excitation signal, that is, at a frequency equal to and in phase with the excitation signal. In this manner, the capacitor 58, in response to output signal 52, oscillates between a charging state and a discharging state in synchronism with excitation signal 50 for producing DC signal 56. It should be noted that by utilizing a square wave excitation signal the switch 60 can be directly driven between junctions 64 and 66 by signal producing source 42 without the necessity of providing an additional square wave producing device.

It should be apparent from the foregoing that synchronous switch 54 provides the proper polarity to device 10. Specifically, when plate 32 is below center, the signal 56 is, for example, positive, causing $I_o$ to be, for example, positive, so as to produce an upwardly directed force Fe. On the other hand, if plate 32 is above center, signal 56 would be of opposite polarity, that is, negative, causing a negative $I_o$ and a downwardly directed force Fg. In this manner, the object 22 can be weighed in the manner illustrated, as well as by inverting device 10 and supporting object 22 on the opposite side of balance pan 16.

The DC signal 56 is amplified by a conventional operational amplifier circuit, generally designated by the reference numeral 72, and thereafter applied to the base of a transistor 74 which has its collector connected with a +20 volt DC supply and its emitter connected to one end of coil 34. The transistor, in response to the amplified signal applied to its base and the +20 volt supply, provides the aforedescribed DC current $I_o$ which is applied to coil 34 for ultimately producing electromagnetic force Fe.

As illustrated in FIG. 2, meter 30 is connected to the otherwise free end of coil 34 for receiving and measuring DC current $I_o$. In this regard, the meter may be appropriately calibrated to measure the weight of object 22 directly in an accurate and uncomplicated manner.

Although one embodiment of the present invention has been illustrated and described, it is anticipated that various changes and modifications will be apparent to those skilled in the art and that such changes may be made without departing from the scope of the invention, as defined by the following claims.

What is claimed is:

1. A device for sensing the weight of an object, comprising: a first circuit including a pair of confronting and spaced-apart electrically conductive members, said circuit being adapted for connection with a signal producing source for producing an oscillatory excitation signal across said electrically conductive members; a second circuit including a junction and a pair of confronting and spaced-apart electrically conductive members connected directly to said junction, said second-mentioned members being spaced from said first-mentioned members; support means adapted to support said object; an electrically conductive coupling member including a first portion positioned between said first-mentioned members and a second portion positioned between said second-mentioned members for capacitively coupling said second circuit to said first circuit, said coupling member being mounted with said support means for movement relative to said first and second-mentioned members in response to the weight of said object when the latter is supported by said support means, said second circuit in response to said excitation signal producing at said junction an oscillatory output signal the amplitude of which is proportional to the position of said coupling member and, therefore, indicative of the weight of said object.

2. A device according to claim 1 wherein said oscillatory excitation signal is substantially a square wave signal.

3. A device according to claim 1 wherein said output signal oscillates about a central reference value indicative of substantially zero weight support by said support means.

4. A device according to claim 1 including means connected with said second circuit and operationally connected with said coupling member for applying a force to said coupling member in response to said output signal, said force being equal and opposite to the gravitational force of said object for terminating movement of said coupling member.

5. A device for sensing the weight of an object, comprising: a first circuit including a first pair of confronting and spaced-apart electrically conductive members, said circuit being adapted for connection with a signal producing source for producing a substantially square wave excitation signal across said first pair of members; a second circuit including a second pair of confronting and spaced-apart electrically conductive members and a single junction connected to said second members, said second members being in alignment with and spaced from said first members; support means adapted to support said object; an electrically conductive coupling member including a first portion positioned between said first members and a second portion positioned between said second members for capacitively coupling said second circuit to said first circuit, said coupling member being electrically insulated from and mounted to said support means for movement relative to said first and second pairs of members in response to the weight of said object when the latter is supported by said support means, said second circuit in response to said excitation signal producing at said junction a square wave output signal, the peak-to-peak amplitude of which is proportional to the position of said coupling member; a third circuit connected with the junction of said second circuit and including means for converting said square wave output signal into a direct current signal having a magnitude proportional to the peak-to-peak amplitude of said output signal, said third circuit further including means responsive to said direct current signal for producing a current, the magnitude of which is proportional to the magnitude of said direct current signal; and means connected with said last-mentioned means and operationally connected with said coupling member for applying a force to the latter in response to and proportional to said current, said force being equal and opposite to the gravitational force of said object for terminating movement of said coupling member whereby the magnitude of said current producing said equal and opposite force is linearly proportional to the weight of said object.

6. A device for sensing the weight of an object, said device comprising: a first circuit adapted for connection with a signal producing source for producing a square wave excitation signal; a second circuit spaced from said first circuit and including an output junction; support means adapted to support said object; coupling means mounted to said support means for movement in response to the weight of said object, said coupling means capacitively coupling said excitation signal to said second circuit for producing at said junction a square wave output signal having a peak-to-peak amplitude dependent upon the position of said coupling means; means connected with said junction and responsive to said output signal for producing a current, the magnitude of which is dependent upon the peak-to-peak amplitude of said output signal; and means connected with said last-mentioned means and operationally connected with said coupling means for applying a force to the latter in response to and proportional to said current, said force being equal and opposite to the gravitational force of said object for terminating movement of said coupling means whereby the magnitude of said current producing said equal and opposite force is linearly proportional to the weight of said object.

7. A device for sensing the weight of an object, comprising: a first circuit adapted for connection with a signal producing source for producing a square wave excitation signal; a second circuit spaced from said first circuit and including an output junction; support means adapted to support said object; coupling means mounted to said support means for movement in response to the weight of said object, said coupling means capacitively coupling said excitation signal to said second circuit for producing at said output junction a current having a magnitude dependent upon the position of said coupling means; and means connected with said junction and operationally connected with said coupling means for applying a force to the latter in response to and proportional to said current, said force being equal and opposite to the gravitational force of said object for terminating movement of said coupling means whereby the magnitude of said current producing said equal and opposite force is proportional to the weight of said object.

8. A device for sensing the weight of an object, comprising: a first circuit including a pair of confronting and spaced-apart electrically conductive members, said circuit being adapted for connection with a signal producing source for producing an excitation signal across said electrically conductive members; a second circuit including a junction and a pair of confronting and spaced-apart electrically conductive members connected with said junction, said second-mentioned members being spaced from said first-mentioned members; a support member adapted to support said object; an electrically conductive coupling member including a first portion positioned between said first-mentioned members and a second portion positioned between said second-mentioned members for capacitively coupling said second circuit to said first circuit, said coupling member being mounted to and physically connected solely with said support member for movement relative to said first and second-mentioned members in response to the weight of said object, said second circuit in response to said excitation signal and the position of said coupling member producing at said junction an output signal having a characteristic proportional to the position of said coupling member and, therefore, indicative of the weight of said object.

9. A device for sensing the weight of an object, comprising: a first circuit adapted for connection with a signal producing source for producing an excitation signal; a second circuit spaced from said first circuit and including an output junction; a support member adapted to support said object; a coupling member capacitively coupling said second circuit to said first circuit, said coupling member being mounted to and physically connected solely with said support member for movement in response to the weight of said object; said second circuit in response to said excitation signal and the position of said coupling member producing at said junction an output signal having a characteristic proportional to the position of said coupling member and, therefore, indicative of the weight of said object.

* * * * *